(12) United States Patent
Damour (10) Patent No.: US 6,540,403 B1
(45) Date of Patent: Apr. 1, 2003

(54) PISTON-PIN BUSHING (75) Inventor: Philippe Damour, Frankfurt (DE)

(73) Assignee: Federal-Mogul Wiesbaden GmbH (DE)

( * ) Notice: Subject to any disclaimer, the term of this patent is extended or adjusted under 35 U.S.C. 154(b) by 0 days.

(21) Appl. No.: 09/720,498

(22) PCT Filed: Jun. 14, 1999

(86) PCT No.: PCT/DE99/01736

§ 371 (c)(1),
(2), (4) Date: Dec. 27, 2000

(87) PCT Pub. No.: WO00/00761

PCT Pub. Date: Jan. 6, 2000

(30) Foreign Application Priority Data

Jun. 27, 1998 (DE) .......................... 198 28 847

(51) Int. Cl.[7] .............................. F16C 33/02
(52) U.S. Cl. ...................................... 384/276
(58) Field of Search ................. 384/273, 276, 384/295

(56) References Cited

U.S. PATENT DOCUMENTS 4,909,638 A * 3/1990 Muto .......................... 384/273

FOREIGN PATENT DOCUMENTS

| DE | 2818378 A1 | 11/1978 |
|---|---|---|
| DE | 4325903 C1 | 8/1993 |
| FR | 2756882 | 12/1996 |
| GB | 1577352 | 10/1980 |
| WO | PCT/DE99/01736 | 6/1998 |

* cited by examiner

Primary Examiner—Christopher P. Schwartz
(74) Attorney, Agent, or Firm—Reising, Ethington, Barnes, Kisselle, Learman & McCulloch, PC (57) ABSTRACT

A piston pin bushing is described which has a sufficient lifespan at higher piston pressures. The piston pin bushing has in each transition region a perforation. The area of material reduction is limited to at least one transition region between the apex lines. The bushing material in this transition region is at least so reduced that in the inserted position a portion of the radial pressure of the piston pin bushing in the area of the apex lines is shifted from the middle to the area of both bushing ends.

9 Claims, 10 Drawing Sheets

PISTON-PIN BUSHING

BACKGROUND OF THE INVENTION

1. Technical Field

The present invention concerns piston pin bushings.

2. Related Art

The present invention concerns a piston pin bushing in accordance with the introductory portion of patent claim 1.

Piston pin bushings are known for example from U.S. Pat. No. 4,909,638 and DE-OS 28 18 378, both of which deal with the manufacture of bushings, in particular with notching. Such bushings are used for housing the connecting rod eye in combustion engines with pistons having an up and down motion. Both parallel bushings and trapezoid bushings are described that can feature oil ducts, as well as oil grooves appearing on the inner surface. These oil grooves, moreover, represent a material weakness; but they are simply inserted in the sleeve bearing material attached on the steel backing with the result that the material weakness of the entire bushing is so small that it has no impact on the radial pressure. The same applies to the oil ducts, whose diameter is so small that the elastic and plastic qualities of the bushing are not affected. Furthermore, the oil grooves extend over the entire interior circumference.

Figure 1A:
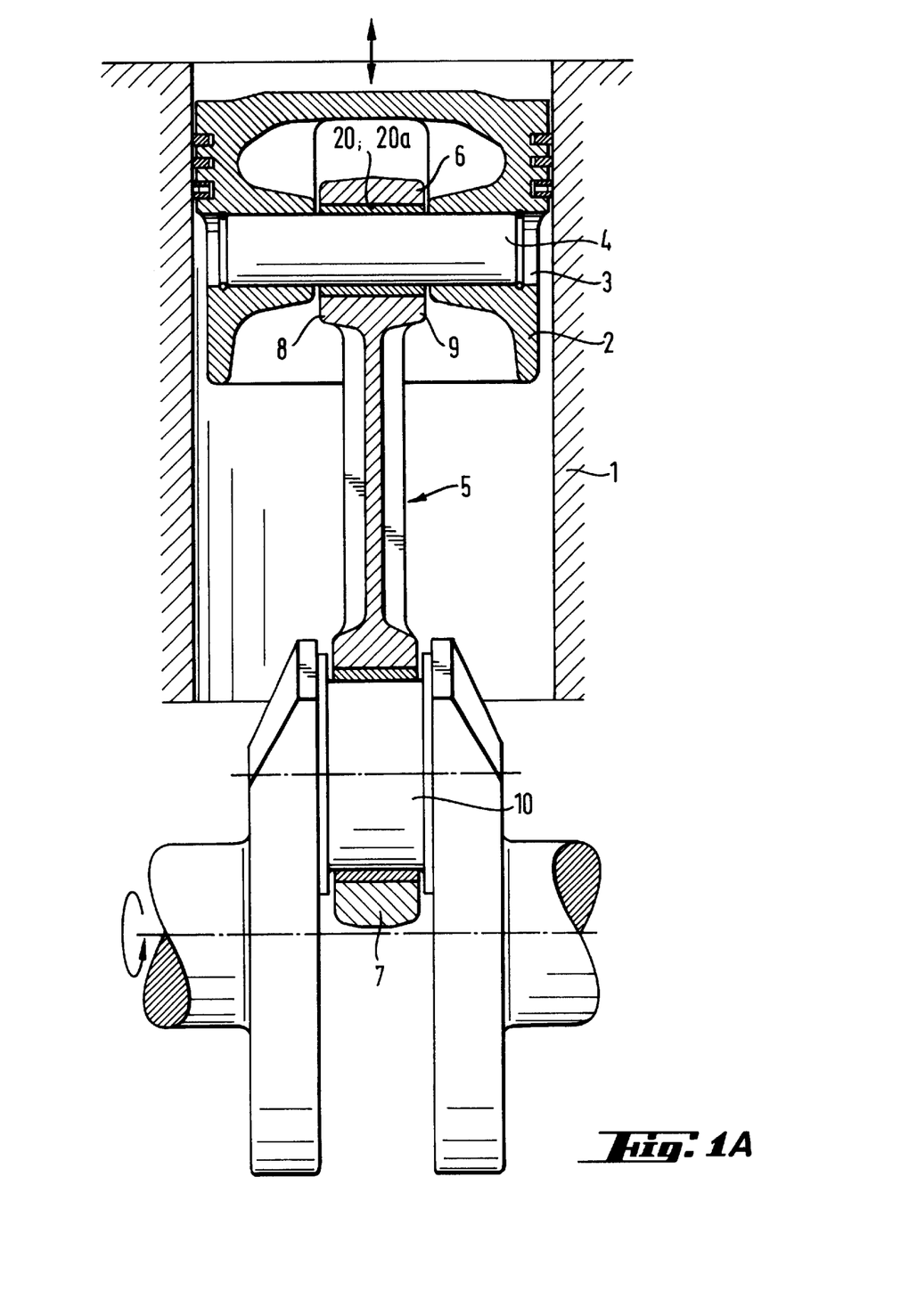
FIG. 1A a longitudinal view through a cylinder with piston, connecting rod eye, and parallel bushing, FIG. 1B a longitudinal view through a cylinder with piston, connecting rod eye, and trapezoid bushing, FIG. 2 the radial pressure distribution of a piston pin bushing (trapezoid bushing) according to the state of the art, FIG. 3 an enlarged diagram of the small end connecting rod eye according to FIG. 1B under load, FIG. 4 perspective diagram of a piston pin bushing according to the present invention, FIG. 5 the radial pressure distribution for the piston pin bushing shown in FIG. 4, FIG. 6 a section through a piston pin bushing with various pockets and perforations, FIG. 7A an axial section through a trapezoid bushing with illustrated transition region, FIG. 7B an axial section through a trapezoid bushing with an illustrated transition region according to another style, and, FIGS. 8–17 Sections through piston pin bushings of different styles.

In FIG. 1A the installation position for a parallel bushing 20, 20a is represented schematically which also applies to the bushing yet to be explained according to the present invention. Piston 2 executes an up and down motion in cylinder 1 that is transferred to connecting rod 5 and lifting pin 10 mounted in large connecting rod eye 7 of the crankshaft. Connecting rod 5 contains a push rod bushing in small connecting rod eye 6, in which bushing the piston pin is housed that extends with both ends in both piston bores 3.

Figure 1B:
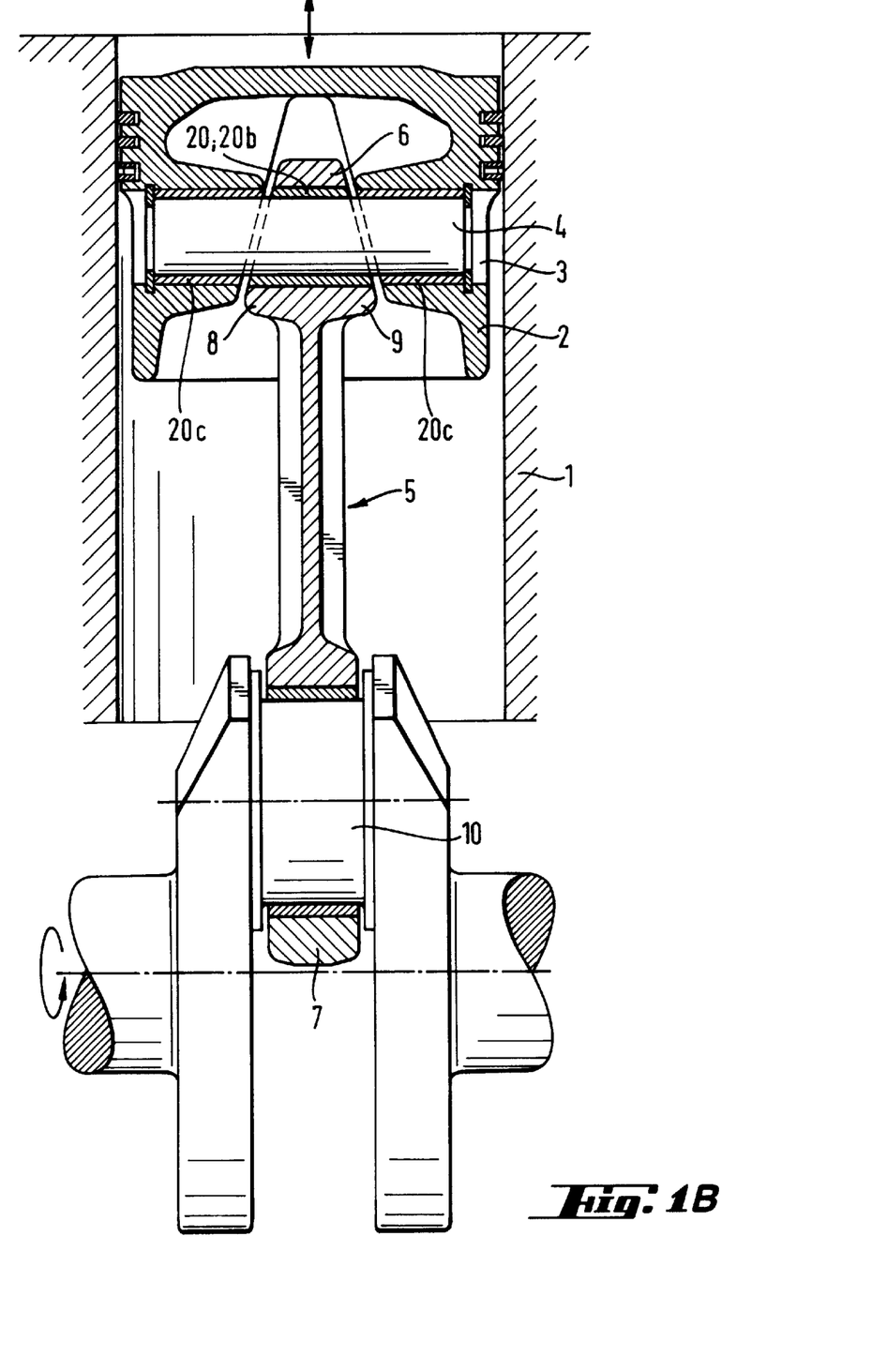

In FIG. 1B piston pin bushings 20b, 20c are designed essentially trapezoidal in the longitudinal view for heavy-duty engines in order to be able to better receive larger forces occurring during the downward motion of the piston, whereby the axially longer section of the bushing lies in the area of maximum load during operation and the axially shorter part of the bushing faces the piston. In using bushings with such beveled ends, a bearing surface can be achieved in this application that is larger in the direction of main load and therefore more effective than those bushings whose ends run perpendicular to the bearing axis of the bushing. With such bushings, both end surfaces, as well as only one end surface, or even only one section of the end surface, can be beveled to the longitudinal axis of the bushing. In FIG. 1B, such half trapezoid piston bushings 20c are used in both piston bores 3, in which the piston pins are no longer directly housed in the piston bores but in both piston pin bushings 20c.

Figure 2:
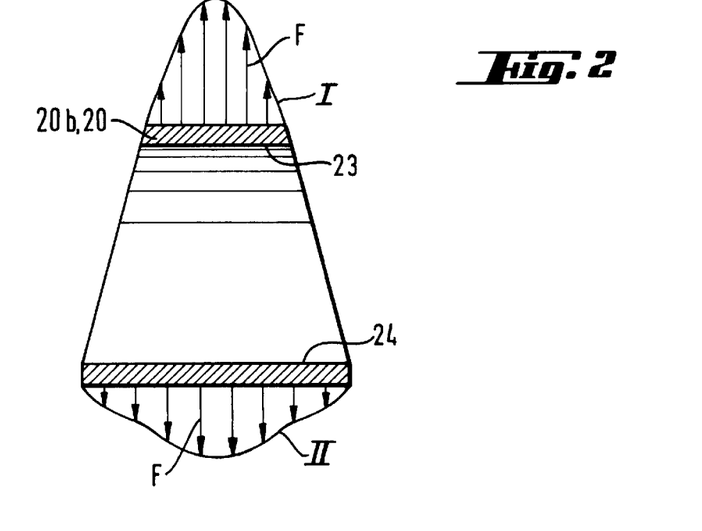

Piston pin bushing 20, 20b is installed in the small end connecting rod eye 6 by press-seating so that, on the basis of contact, the piston pin bushing exerts a radial pressure on the connecting rod bore which runs a roughly parabolic course in the axial direction, as is shown in FIG. 2 for the realms of both apex lines 23 and 24 by curves I and II.

Figure 3:
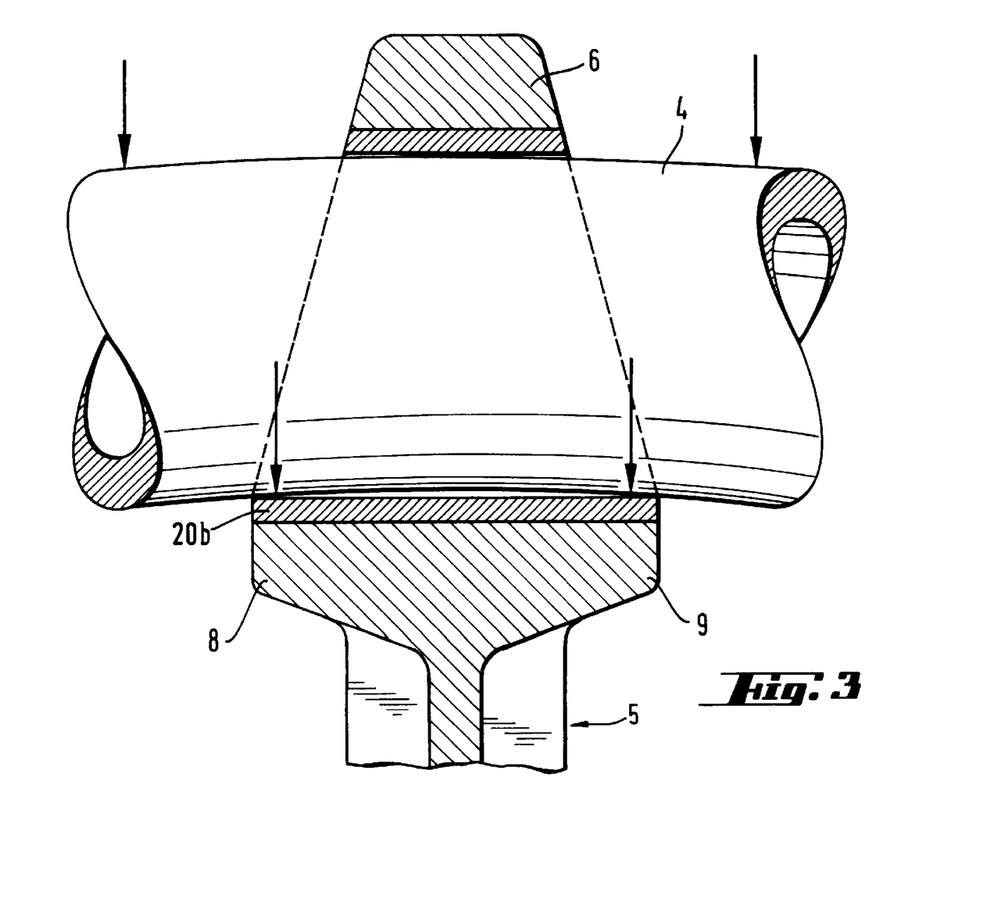

The contact pressure diminishes at the edge where the piston pin bushing 20 is most loaded during downward motion of piston 2 under consideration of elastic deformation of the piston pin, as is shown for clarification in FIG. 3 in exaggerated representation. Piston pin 4 is thus somewhat deflected by the pressure of the piston so that piston pin bushing 20 is most loaded at the edge, whereby both ends 8 and 9 of the small end connecting rod eye 6 are deflected downwards.

A relative motion between bushing body and connecting rod eye leads, hereby, to friction corrosion. If the load is removed, the bushing springs back to its original position and lifts from the connecting rod body so that in these places oil can penetrate under the bushing body. Both effects result in a diminished lifespan of the piston pin bushing.

Since the maximum cylinder pressure has been increased in automobile manufacture due to direct injection and turbo supercharging in diesel engines in order to reduce fuel consumption or to achieve the prescribed emission values, the load of the piston pin bushing and the connecting rod in the connecting rod eye has increased. The result is that friction corrosion has appeared on the edge of the axially longer section of the piston pin bushing in the rear while crack formations have appeared on the interior, which harm the life-span of the piston pin bushing.

Although it had been attempted in the past to improve conditions by special processing of the bore, precision installation, and optimization of the geometry of the connecting rod eye, problems have not yet been satisfactorily solved.

Proceeding from this knowledge, it is the task of the present invention to create a piston pin bushing that exhibits a sufficient lifespan even at higher piston pressures.

SUMMARY OF THE INVENTION

This task will be solved with a piston pin bushing in which the area of material reduction is limited to at least one transition region between the apex lines and that the bushing material is reduced in this transition region at least to the extent that a portion of the piston pin bushing's radial pressure in the area of the apex lines is shifted in its inserted position from the middle to the area of both bushing ends. that the bushing material is reduced in this transition region at least to the extent that a portion of the piston pin bushing's radial pressure in the area of the apex lines is shifted in its inserted position from the middle to the area of both bushing ends.

It has been shown that crack formation and friction corrosion are clearly diminished by these methods, which can be traced back to the fact that the contact pressure distribution in the area of the apex lines is changed by the material reduction in a such way that no motion occurs in the longitudinal direction of the bushing on the one hand and, on the other, that the bushing does not prematurely spring back during removal of the load. The bushing body clings to the connecting rod through the increased radial pressure in the end area of the bushing so that relative motions cannot occur.

In order not to impair the surface of the piston pin bushing, the material reduction is to be limited to a transition region between both vertical lines, in which, by reasons of symmetry, the methods in accordance with the present invention are implemented preferably in both possible transition regions between both vertical lines.

Preferably, the transition region on the interior side and/or the bushing exterior side can have at least one pocket. The two dimensional extension and form of the pocket as well as the depth of the pocket or pockets must be selected in such a way that the radial pressure increase according to the present invention occurs in the area of the bushing ends. Conventional pockets are simply put in the slide bearing material. According to the present invention, it is, however, an advantage if these pockets, which are provided on the bushing interior side, extend to the back of the bushings, because in this way the desired material attenuation can be achieved.

In manufacturing the pockets, the bushing material must be detached, by which is understood both the material of the bushing back and the slide bearing material. A pressing procedure for the manufacture of such pockets is not suitable because the material displaced from the pockets leads to a stiffening and thereby to an undesired impact on the elastic and plastic qualities of the bushing material, so that the radial pressure in the area of the bushing ends cannot be increased.

The material diminishment for the purpose of exceeding the flow limit in the inserted position of the bushing, i.e., with conventional press-seating in the connecting rod eye, can proceed until the bushing material is completely detached. The bushing can exhibit not only pockets, but also perforations, whereby pockets and perforations can be combined. These combinations include the possibility that the perforations are provided in the area of the pockets or outside of the pockets.

Concerning the size and the design of such perforations, the same criteria apply as for pockets.

Preferably the transition region extends in the direction of circumference over a 100° sector. The transition region is advantageously distant from one of the apex lines between 30° and 50°.

The piston pin bushing can be a parallel bushing or a trapezoid bushing, whereby such bushings under trapezoid bushing are understood as those that simply have a sloped end. Trapezoid bushings are installed in such a way that the first apex line lies in the axially shorter section and the second apex line lies in the axially longer section.

In the trapezoidal bushings the transition region or regions are fitted to the trapezoid form in such a way that the width of the transition region grows in the direction from the first apex line to the second apex line. While the transition region is detached in the parallel bushing at least $l_2/4$ from the edge of the bushing, the dimensions are oriented according to the lengths of the various long apex lines. With a trapezoid bushing, the transition region is thus preferably distant from the edge of the bushing at least $l_1/4$ near the first apex line and at least $l_2/4$ near the second apex line.

This leads preferably to a triangular arrangement or design of pockets and/or perforations, whereby the number and form of pockets and/or perforations can be selected at will. The pockets and/or perforations can lie in the area of the oil grooves or be connected with them so that the pockets and/or perforations can serve as oil reservoirs, which afford an additional positive result.

Embodiments that exemplify the design of the present invention are further explained by the following illustrations.

THE DRAWINGS

They show.

DETAILED DESCRIPTION

Figure 4:
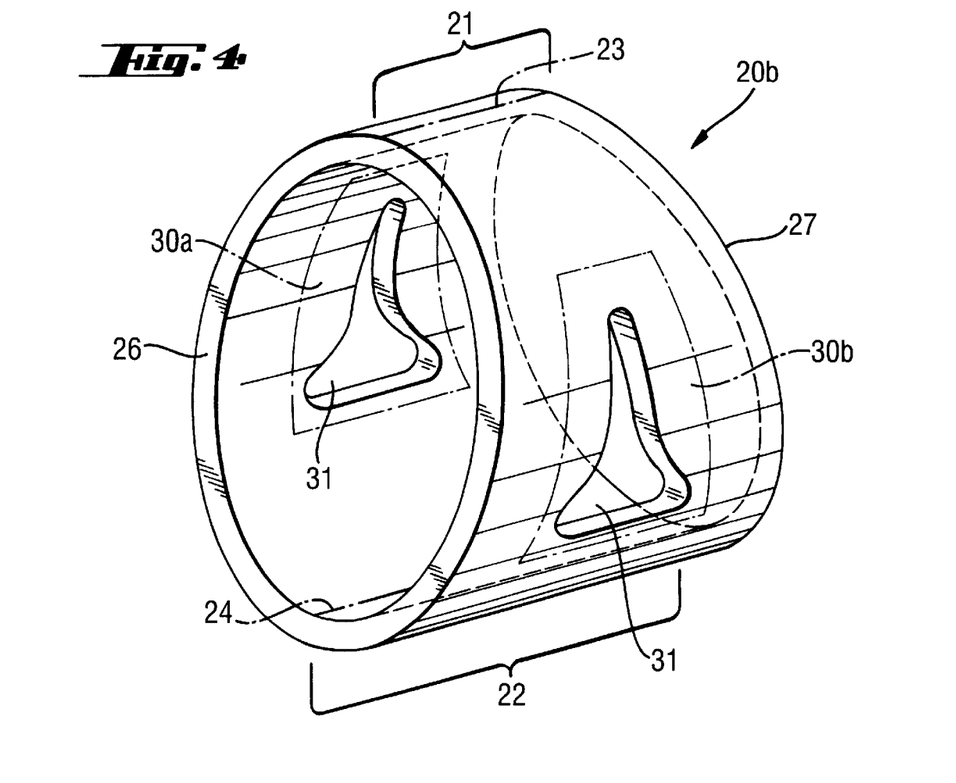

In FIG. 1B, the inserted position of piston pin bushing 20 is represented which can be seen in FIG. 4 in the perspective diagram. A trapezoid bushing 20*b* is referred to here in the style shown having an axially shorter section 21 and an axially longer section 22. Both edges 26,27 of piston pin bushing 20*b* are inclined to the longitudinal axis. Both apex lines sides 23 and 24 are in the axially shorter section 21 in the narrowest place and in the axially longer section in the widest place respectively.

Between both of these apex lines 23 and 24 there are two transition regions 30*a* and 30*b* that are distant from the apex lines 23 and 24 as well as the respective edges of the piston pin bushing 26 and 27. Within the transition region 30*a* and 30*b* there is a surface area in which the bushing material has been reduced. In the embodiment shown here the material has been completely removed so that perforations 31 occur which exhibit a bottle like contour, whereby the width of the perforation increases from the first apex line 23 in the direction of the second apex line 24.

Figure 5:
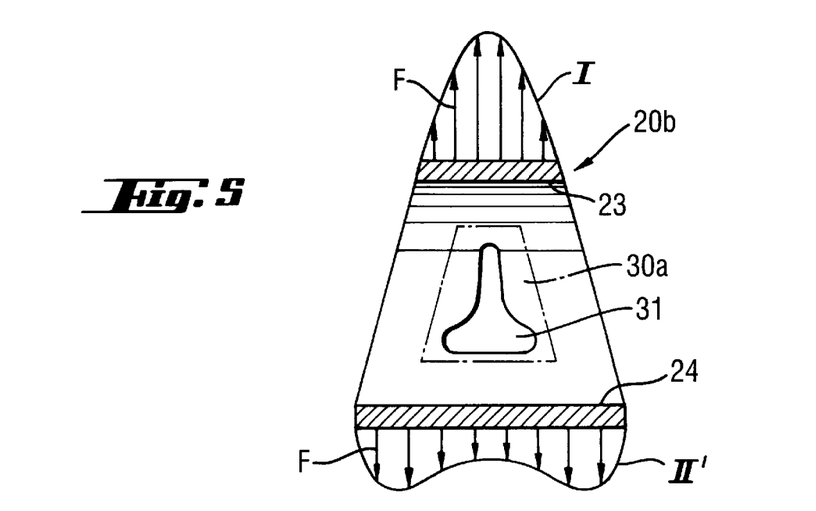

The resulting pressure distribution during insertion in a connecting rod is seen in FIG. 5 according to the illustration of FIG. 2. On the basis of the perforation 31, the pressure distribution is changed in the area of the axially longer section 22 in such a manner that the radial pressure forces F increase toward the edge and decrease only just before the edge. A double arch curve II is obtained. This altered pressure distribution causes a sufficient press-seating of the piston pin bushing to be present even at maximum load through the piston pressure. It is hereby assured that the bushing 20*b* in the axially longer area does not under the effect of the dynamic load lift from the ends 8 and 9 of the small end connecting rod eye with the result that friction corrosion is prevented.

Figure 6:
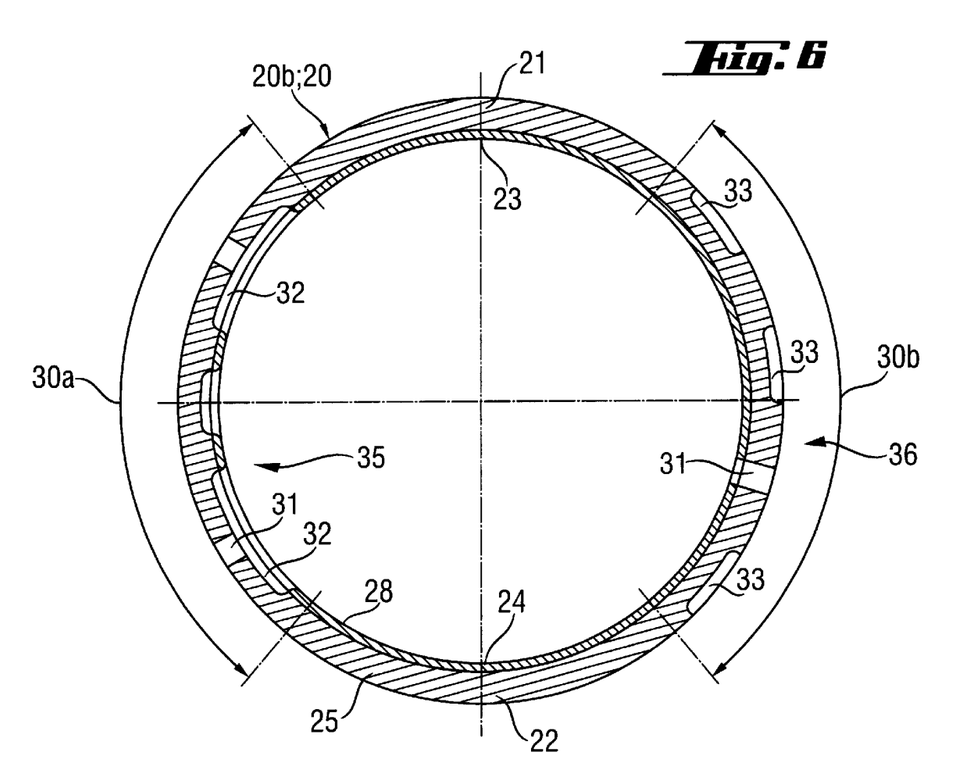

In FIG. 6 a cross-section through a piston pin bushing 20 is shown, by means of which the different possibilities of material reduction are explained. The piston pin bushing has a bushing back 25, which bears a slide bearing material 28 on the inner surface. In the left area of the piston pin bushing 20, pockets 32 on the inner side 35 are provided, whereby perforations 31 are additionally placed in the area of these pockets. The radial extension of pockets 32 is oriented according to the wall thickness and material qualities of the piston pin bushing 20. The pockets 32 must be large enough that during insertion, i.e., press-seating, the desired radial pressure force distribution—as shown in FIG. 5—can result in the area of the axially longer section 24.

On the right side, pockets 33 are provided on the exterior side 36 of the piston pin bushing that can be combined with perforations 31. These perforations 31 can likewise be next to, between or in the pockets 33. The number and form of pockets and/or perforations as well as their arrangement and the extent of the material reduction are oriented according to the qualities of the bushing materials and the force distribution that is to be influenced by the design of the bushing.

Figure 7A:
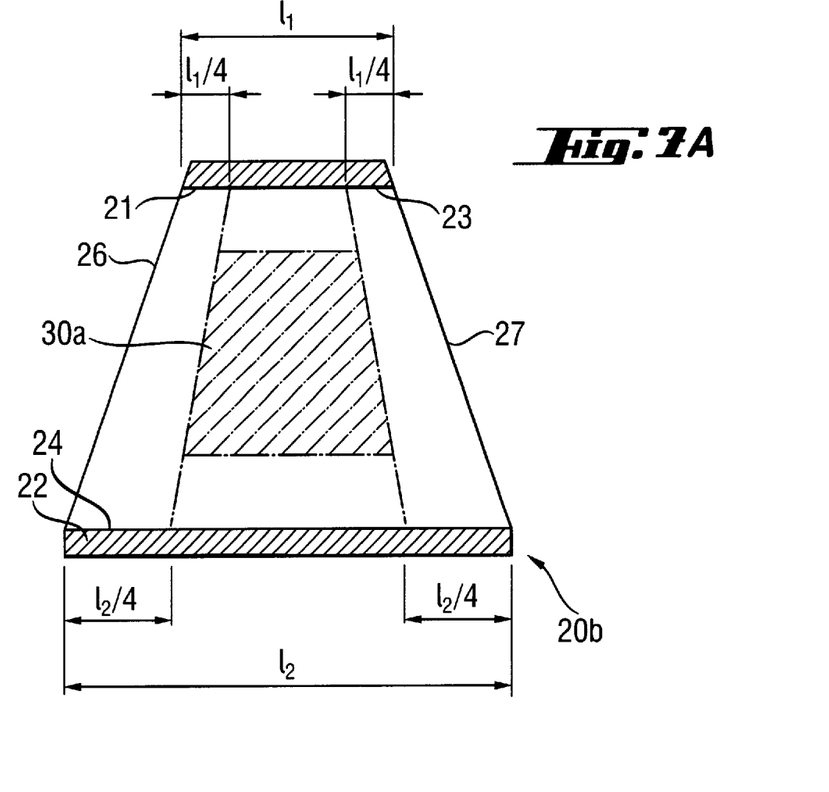
Figure 7B:
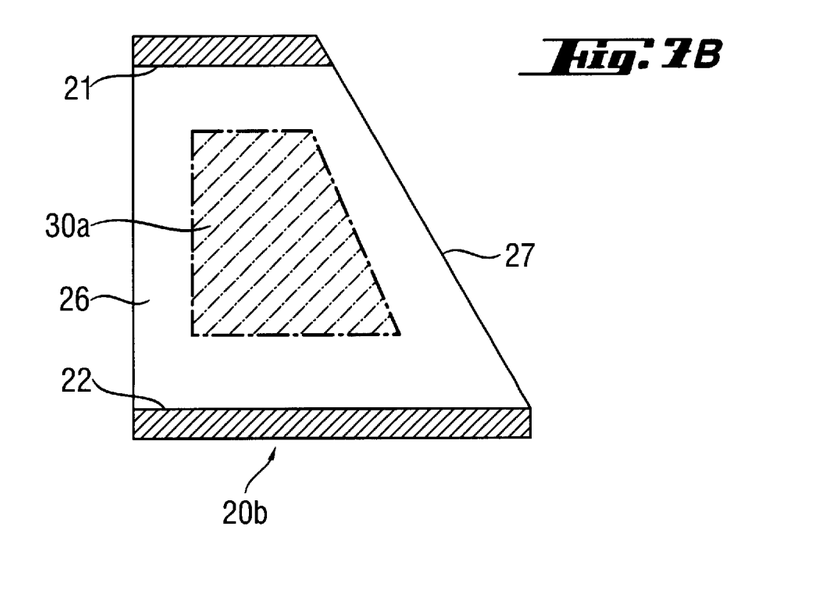

In FIGS. 6, 7*a,b* the transition region 30*a*, 30*b* is illustrated on the interior side of two bushings 20*b* represented by longitudinal section. A preferred transition region 30a,b can be defined via the angle area and the length 1₁ or 1₂ of the axially shorter section 21 and of the axially longer section 22 respectively. The transition region 30a,b covers a sector of 100° that is distant in each case by 40° from the first and the second apex line 23, 24. Thereby it is assured that the axially shorter or axially longer section 21, 22 is not weakened in the area of maximum load through material reduction. The material reduction is thus limited to a transition region, which is not affected by the maximum load. The distance from the edges 26 and 27 of the piston pin bushing is at least $1_1/4$, whereby the edge strip in the embodiment shown here continually increases from the value $1_1/4$ to the value $1_2/4$.

Figure 8A:
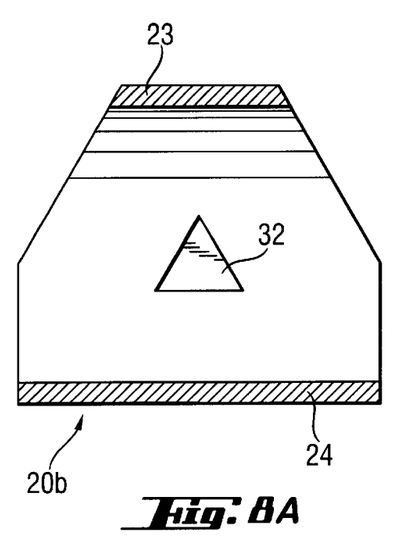
Figure 8B:
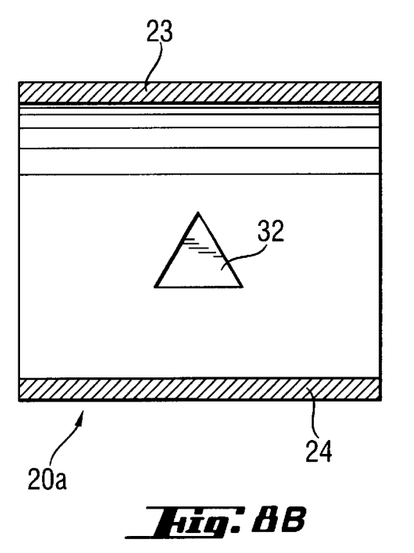
Figure 9:
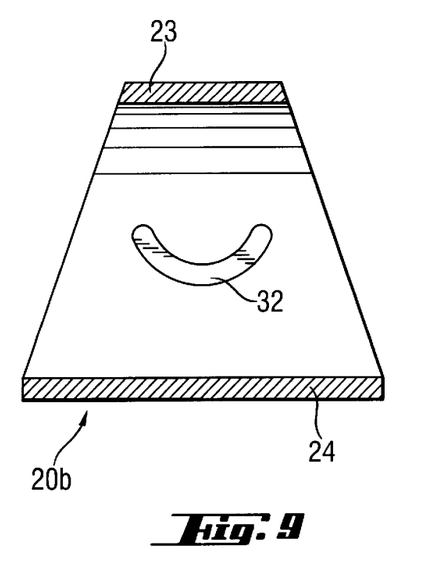
Figure 10A:
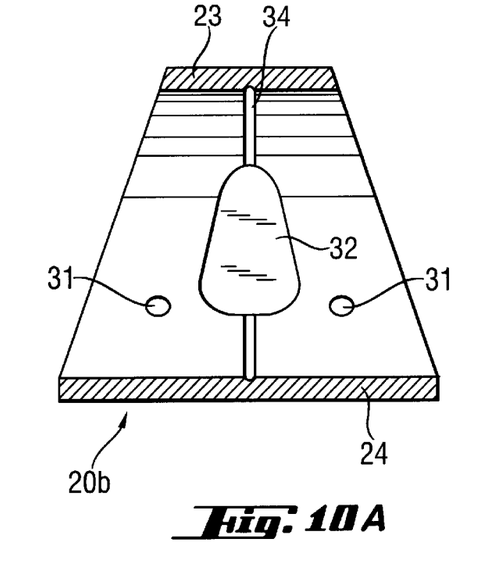

In FIGS. 8A, B to 17 further embodiments are shown. In FIG. 8A a piston pin bushing 20 is seen, in which the end sections are only partially sloped. In the transition region a triangular deepening 32 is represented. FIG. 8B shows a corresponding parallel bushing 20b. In FIG. 9, an arched pocket 32 is shown and in FIG. 10A, a combination from a pocket 32 and perforations 31. The perforations 31 are made in the lower area of the axially longer section. The form of pocket 32 is essentially triangular and in the embodiment shown here pocket 32 is connected with an oil groove 34.

Figure 10B:
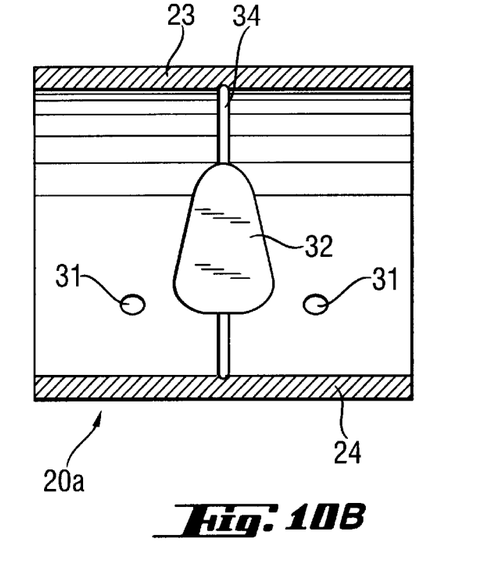
Figure 11A:
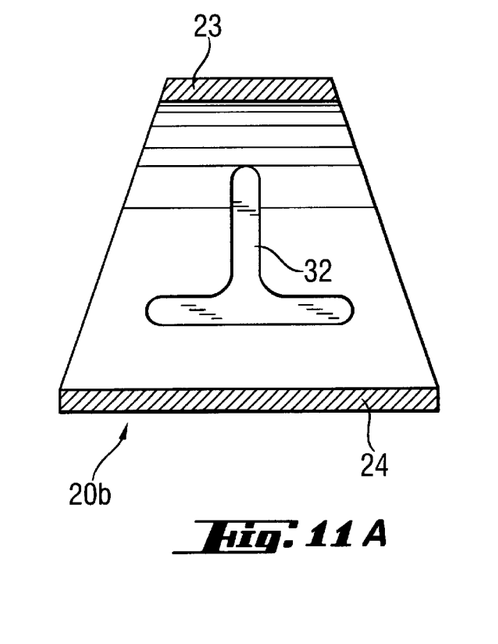
Figure 11B:
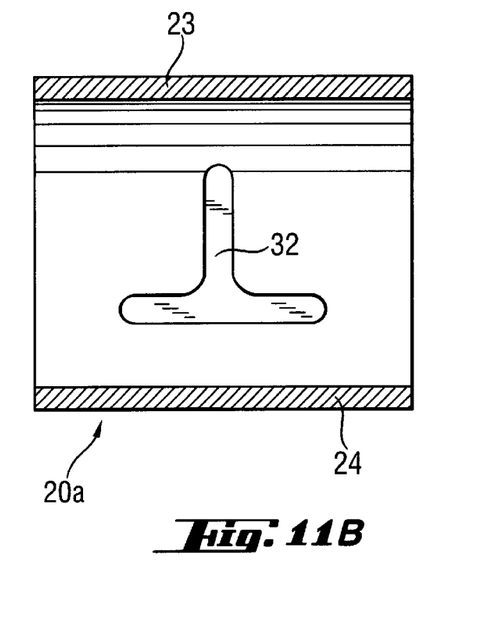
Figure 12:
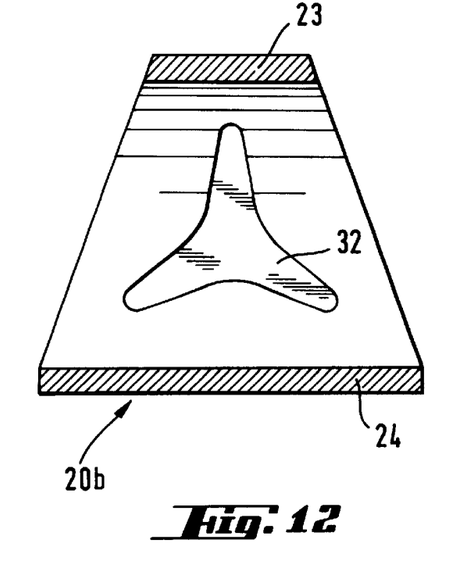
Figure 13:
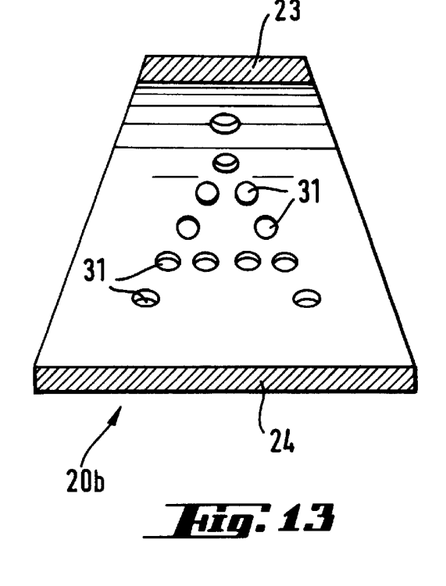

In FIG. 11A a T-shaped pocket 32 and in FIG. 12 a star-shaped pocket 32 are shown. FIG. 10B and 11B show analogous parallel bushings 20b. FIG. 13 shows an arrangement of several circle-shaped perforations 31 that together give the configuration of letter A.

Figure 14:
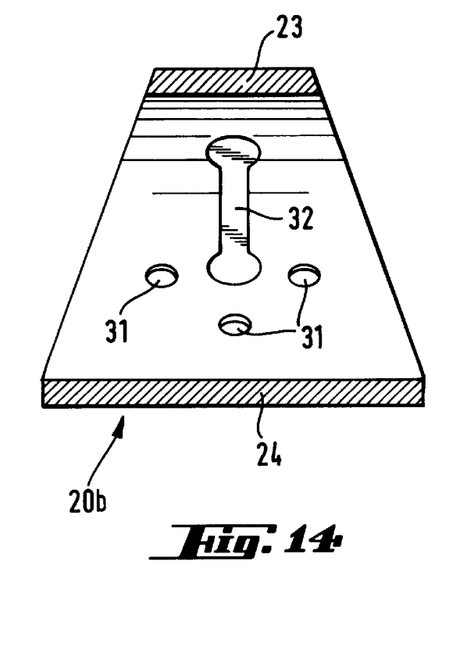

In FIG. 14 a pocket 32 is combined with circle-shaped perforations 31.

Figure 15:
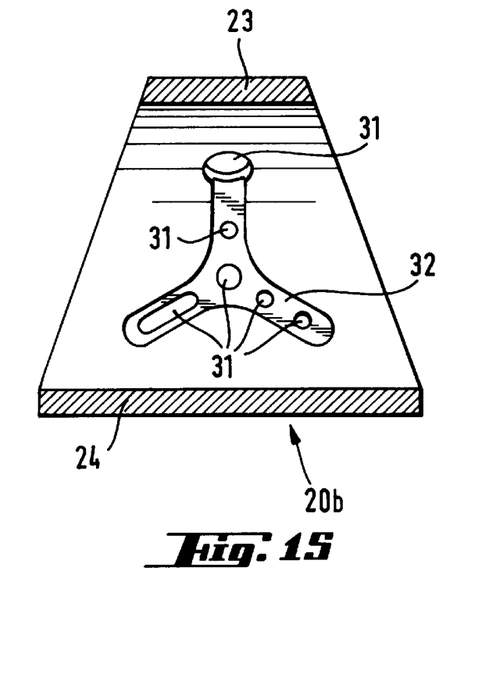

In FIG. 15 the perforations 31 are in the area of the star-shaped inner pocket 32.

Figure 16:
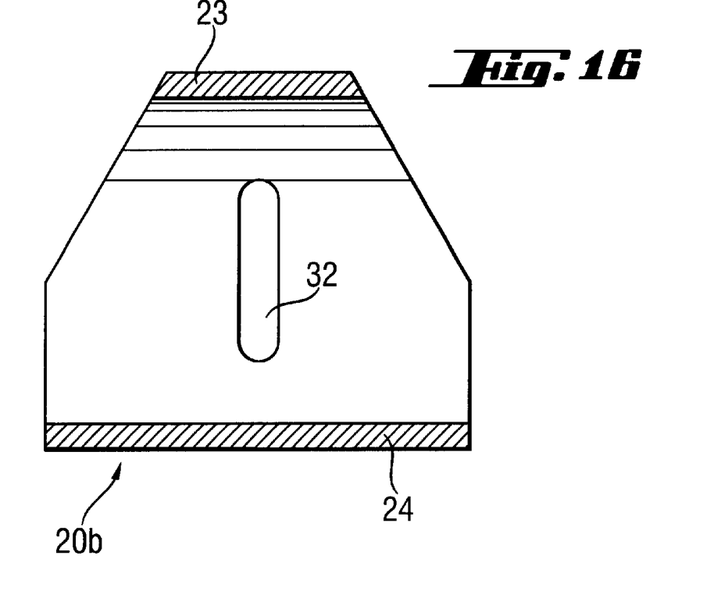
Figure 17:
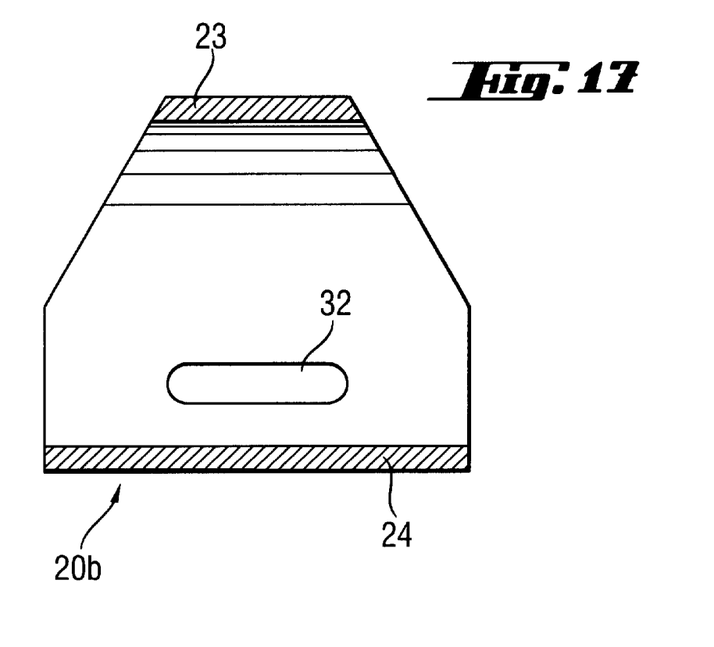

In FIGS. 16 and 17 bushings 20 are shown whose exterior edges correspond to the bushing shown in FIG. 8A. Longitudinal perforations 32 are provided that extend in the direction of axis or circumference.

What is claimed is:

1. A trapezoid piston pin bushing fabricated of bushing material comprising a bushing back and slide bearing material applied to the bushing back and having two opposing apex lines receiving a main load in an inserted position and having an axially shorter section forming the first apex line and an axially longer section forming the second apex line, and an area of material reduction limited to at least one transition region between the apex lines in which the width of the transition region increases in the direction of the first apex line to the second apex line, and in that the bushing material in the transition region is at least so reduced that in the inserted position a portion of the radial pressure of the piston pin bushing in the area of the apex lines is shifted from a middle of the bushing toward areas of opposite bushing ends, said transition region extending in the direction of circumference over a 100° sector.

2. The piston pin bushing according to claim 1, wherein the transition region has at least one pocket.

3. The piston pin bushing according to claim 2, wherein the pocket is located on a bushing inner side and extends into a back side of the bushing.

4. The piston pin bushing according to claim 1, wherein the transition region has at least one perforation.

5. The piston pin bushing according to claim 1, wherein the transition region is distant from one of the apex lines by between 30° and 50°.

6. The piston pin bushing according to claim 1, wherein the bushing comprises a bushing.

7. The piston pin bushing according to claim 1, wherein the transition region is removed from an edge of the bushing by at least 1/4, whereby the length of the apex line is 1.

8. The piston pin bushing according to claim 1, wherein the transition region is distant from a bushing edge by at least $1_1/4$ near the first apex line and at least $1_2/4$ near the second apex line, whereby 11 and 12 are the length of the first apex line and the second apex line.

9. A trapezoid piston pin bushing fabricated of bushing material comprising a bushing back and slide bearing material applied to the bushing back and having two opposing apex lines receiving a main load in an inserted position and having an axially shorter section forming the first apex line and an axially longer section forming the second apex line, and an area of material reduction limited to at least one transition region between the apex lines in which the width of the transition region increases in the direction of the first apex line to the second apex line, and in that the bushing material in the transition region is at least so reduced that in the inserted position a portion of the radial pressure of the piston pin bushing in the area of the apex lines is shifted from a middle of the bushing toward areas of opposite bushing ends, and wherein the transition region extends above a longitudinal axis of the bushing when the bushing is oriented with the first apex line arranged vertically above the second apex line.

* * * * *